(12) United States Patent
McQuillan et al.

(10) Patent No.: US 7,476,148 B2
(45) Date of Patent: Jan. 13, 2009

(54) APPARATUS FOR TRUSSING A BIRD

(75) Inventors: Martin McQuillan, Ballymena (GB);
Christina McQuillan, Ballymena (GB);
Mark McKeown, Ballymena (GB)

(73) Assignee: Stork PMT B.V., AV Boxmeer (NL)

( * ) Notice: Subject to any disclaimer, the term of this patent is extended or adjusted under 35 U.S.C. 154(b) by 0 days.

(21) Appl. No.: 11/631,360

(22) PCT Filed: Jul. 4, 2005

(86) PCT No.: PCT/GB2005/002597

§ 371 (c)(1),
(2), (4) Date: Apr. 30, 2007

(87) PCT Pub. No.: WO2006/003418

PCT Pub. Date: Jan. 12, 2006

(65) Prior Publication Data

US 2007/0243807 A1    Oct. 18, 2007

(30) Foreign Application Priority Data

Jul. 2, 2004    (GB) ............................... 0414892.0

(51) Int. Cl.
*A22C 18/00* (2006.01)
(52) U.S. Cl. ..................................... 452/154
(58) Field of Classification Search ................. 452/185, 452/188, 149–153, 154, 155, 156, 161–163, 452/166, 169
See application file for complete search history.

(56) References Cited

U.S. PATENT DOCUMENTS 4,172,305 A * 10/1979 Henebry et al. ............. 452/193
7,004,830 B2 * 2/2006 van der Steen et al. ...... 452/185

FOREIGN PATENT DOCUMENTS

| EP | 0 413 629 A1 | 2/1991 |
| EP | 0 425 400 A1 | 5/1991 |
| EP | 1 419 697 A1 | 5/2004 |
| FR | 2 485 336 A1 | 12/1981 |

* cited by examiner

*Primary Examiner*—Thomas Price
(74) *Attorney, Agent, or Firm*—Ronald E. Greigg

(57) ABSTRACT

An apparatus for trussing a bird comprising a main body having a platform for supporting the bird, the platform and main body having a bird keel end and a bird wishbone end, clamping means movably mounted on the main body for securing the bird on the platform and releasing the bird from the platform, shackle means mounted on the main body and being disposed above the bird keel end of the platform for receiving and at least temporarily securing the legs of the bird, a leg engaging and supporting means movably mounted on opposite lateral locations of the main body for tightening leg knuckles of a bird into the shackle means before flexing, for preventing twisting of the legs and for bending the legs over the wings, a first drive means operably engagable with the clamping means, the shackle means and the leg engaging and supporting means to sequentially clamp the bird, shackle, stretch and flex the clamped birds legs and to release the clamped bird.

41 Claims, 2 Drawing Sheets

APPARATUS FOR TRUSSING A BIRD

CROSS-REFERENCE TO RELATED APPLICATION

This application is a 35 USC 371 application of PCT/GB 2005/002597 filed on Jul. 4, 2005.

BACKGROUND OF THE INVENTION

1. Field of the Invention

The present invention relates to an apparatus for trussing a chicken or some similar bird.

2. Description of the Prior Art

Traditionally, chickens are trussed manually by staff who are generally able to truss two to three chickens a minute. It takes anything from ten to fourteen weeks to train a person up to the level of competence where they can truss two to three chickens a minute. Out of every ten staff who start on this course, only two or three stay any considerable length of time. Additionally, in order to truss the chickens the tendons in the chicken's legs need to be vigorously flexed to allow the shanks and drumsticks of the chicken to be subsequently folded inside the body cavity of the chicken. The shanks are the end pieces of the chicken's legs once the feet have been removed and the shanks are connected to the drumsticks which are connected to the thighbones in turn.

This vigorous flexing of the chicken's legs can cause repetitive strain injury in the operative's joints, which is uncomfortable for the employee and can be costly to the employer.

OBJECTS AND SUMMARY OF THE INVENTION

It is an object of the present invention to overcome the above outlined problems.

Accordingly, the present invention provides an apparatus for trussing a bird comprising a main body having a platform for supporting the bird, the platform and main body having a bird keel end and a bird wishbone end, clamping means movably mounted on the main body for securing the bird on the platform and releasing the bird from the platform, shackle means mounted on the main body and being disposed above the bird ked end of the platform for receiving and at least temporarily securing the legs of the bird, a leg engaging and supporting means movably mounted on opposite lateral locations of the main body for tightening leg knuckles of a bird into the shackle means before flexing, for preventing twisting of the legs and for bending the legs over the wings, first drive means operably engagable with the clamping means, the shackle means and the leg engaging and supporting means to sequentially clamp the bird, shackle, stretch and flex the clamped birds legs and to release the clamped bird.

Ideally, a bird leg shank insertion means is movably mounted on the main body to receive and urge a bird's leg shanks inside the bird's own body cavity wherein second drive means are operably engagable with the shank insertion means.

Preferably, a pressing means is movably mounted on the shackle means and the pressing means is movable relative to the shackle means wherein third drive means are operably engagable with the pressing means.

Ideally, compression means are movably mounted on the wishbone end of the main body and the keel end of the main body to engage the wishbone end and the keel end of the bird and to compress these ends together wherein fourth drive means are operably engagable with the compression means.

Preferably, the drive means comprises a number of actuators selected from a group consisting of cams, guide rails, pneumatic and electromagnetic actuators.

Ideally, the clamping means comprises an elongate clamping bar pivotally mounted on the main body.

Preferably, the elongate clamping bar protrudes from the keel end of the main body centrally above the platform.

Ideally, the elongate clamping bar has a bird clamping end and a drive means engaging end.

Preferably, the shank insertion means comprises a chute movably mounted on a shank insertion bar which is slidably mounted on the main body.

Ideally, the chute protrudes from the keel end of the main body and extends into a space above the platform and the clamping means.

Preferably, the shank insertion means comprises an associated shank-tucking member slidably movable along the chute.

Ideally, the shank-tucking member is normally located at the keel end of the chute and is operable between this normal position and a location along the chute toward the wishbone end of the chute by a shank tucking member drive means.

Preferably, the chute is an inverted u-shaped section having mutually opposing cutaway slots on opposite lateral side members of the u-shaped section.

Ideally, the chute is pivotally mounted on one end of the shank insertion bar.

Preferably, the other end of the shank insertion bar has drive-engaging means.

Ideally, the shank insertion bar has a biasing means normally biasing the chute into a retracted position out of the body cavity of the bird.

Preferably, the shackle means comprises an elongate bracket extending transverse the main plane of the main body at our about the bird keel end of the main body, the elongate bracket having a u-shaped recess on opposite ends of the elongate bracket for receiving the legs of a bird.

Ideally, the pressing means comprises a lever carrying an elongate presser bar having a is rigid roller on opposite ends of the presser bar.

Preferably, the leg engaging and supporting means comprises a pair of mirror image rod arrangements each having a substantially horizontal mounting rod pivotally mounted at or about a lateral edge of the bird wishbone end of the main body.

Ideally, an elongate member extends from the outer end of the mounting rod and has a plane of rotation substantially parallel to the main plane of the main body, a leg engaging rod being mounted at the end of the elongate member and extending toward the main body.

Preferably, a leg supporting rod is mounted on the elongate member adjacent the leg engaging rod and extending in a direction from the bird keel end to the bird wishbone end of the main body.

Ideally, the compression means comprises a pusher plate movably mounted on the main body intermediate the chute and the clamping bar and a breast lifting mechanism movably mounted on the bird wishbone end of the main body.

Preferably, the pusher plate is mounted on an elongate pusher plate bar which is slidably mounted on the main body.

Ideally, the end of the pusher plate bar distal from the pusher plate has means for engaging drive means.

Preferably, the pusher plate is inclined at a predetermined angle for optimising shank and leg insertion into the body cavity of the bird.

Ideally, the angle of the pusher plate is in the range of 20° to 40°.

Preferably, the pusher plate bar has a biasing means normally biasing the pusher plate towards the main body away from the keel of the bird.

Ideally, the breast lifting mechanism comprises a breast engaging plate mounted on a lever which is pivotally mounted on the bird wishbone end of the main body, the end of the lever distal from the pivot having means for engaging a drive means.

Preferably, the platform is movable relative to the main body.

Ideally, the first drive means comprises a clamping guide operably engagable with the clamping means for moving the clamping means between a chicken clamping position and a chicken mounting and releasing position, a leg engaging and supporting means actuator for activating the leg engaging and supporting means between an inoperative position and a leg supporting position and between an inoperative position and a leg stretching position and a means for sealing and releasing the shackle means.

Preferably, the third drive means further comprises a pressing guide for operable engagement with the pressing means for moving the pressing means between a normally retracted inoperative mode and an operative fully forward mode for flexing a chickens tendons by bending their shanks forward. Ideally, the fourth drive means, comprises a breast-lifting mechanism guide for operable engagement with the breast-lifting mechanism for moving the mechanism between a normally lowered position into a raised position simultaneously with the action of a second cam surface moving the pusher plate forward to effect compression of the chicken body. Preferably, the second drive means comprises a tucking member actuator for activating the tucking member of the shank insertion means and a first cam surface operably engagable with the shank insertion means to move it between a chicken loading position where the shank insertion means is located over the platform to be inside the body cavity of a chicken and a chicken unloading position, where the shank insertion means is withdrawn out of the body cavity of the chicken.

It will also be appreciated that any other suitable type of actuator can also be used if desired and the actuator units described in this specification are only an example of the many actuators freely available to be used to actuate the relevant moving parts of the trussing apparatus and the trussing carousel assembly.

Preferably, the elongate clamping bar extends substantially parallel to the longitudinal axis of the platform and main body.

Preferably, the drive means engaging end of the elongate clamping bar is a cam-engaging end.

Alternatively, the drive means engaging end of the clamping bar is connected to a pneumatic cylinder. The cylinder allows the clamping bar to be adjusted to a range of different clamping positions to compensate for the various positions of the adjustable platform.

Ideally, the chicken clamping end and the cam-engaging end of the clamping bar are on opposite sides of the pivot.

Ideally, the shank tucking member drive means is electromagnetic, pneumatic or mechanical.

Preferably, the shank tucking member drive means is a linear pneumatic cylinder.

Preferably, the drive-engaging means of the shank insertion bar is a wheel.

Preferably, the pressing means comprises a lever mechanism carrying an elongate pressing bar having a rigid roller on opposite ends of the bar, the bar being spaced apart from the bracket and having a longitudinal axis substantially parallel to the longitudinal axis of the bracket so that movement of the lever causes the rollers to rotate around the u-shaped recesses of the elongate bracket.

Ideally, the leg-supporting rod of the leg engaging and supporting means mitigates against rotation of the legs of the chickens during the knuckle-tightening phase and reduces the risk of breakage.

Preferably, a wheel is mounted on the pusher plate for engaging the drive means.

Ideally, the drive means for engaging the pusher plate wheel is a cam.

Preferably, a roller is mounted on the breast lifting mechanism for engaging the drive means.

In another aspect of the invention, there is provided a carousel trussing assembly having a rotating table in operable engagement with a carousel trussing assembly drive means for rotating the table and a plurality of bird trussing apparatuses mounted on the rotating table, each of the bird trussing apparatuses comprising a main body having a platform for supporting the bird, the platform and main body having a bird keel end and a bird wishbone end, clamping means movably mounted on the main body for securing the bird on the platform and releasing the bird from the platform, shackle means mounted on the main body and being disposed above the bird keel end of the platform for receiving and at least temporarily securing the legs of the bird, a leg engaging and supporting means movably mounted on opposite lateral locations of the main body for tightening the leg knuckles of a bird into the shackle means before flexing, for preventing twisting of the legs during tightening and for bending the legs over the wings, first drive means operably engagable with the clamping means, the shackle means and the leg engaging and supporting means to sequentially clamp the bird, shackle, stretch and flex the clamped birds legs and to release the clamped bird.

BRIEF DESCRIPTION OF THE DRAWINGS

The invention will be described more fully herein below, with reference to the drawings, in which.

DESCRIPTION OF THE PREFERRED EMBODIMENTS

Figure 1:
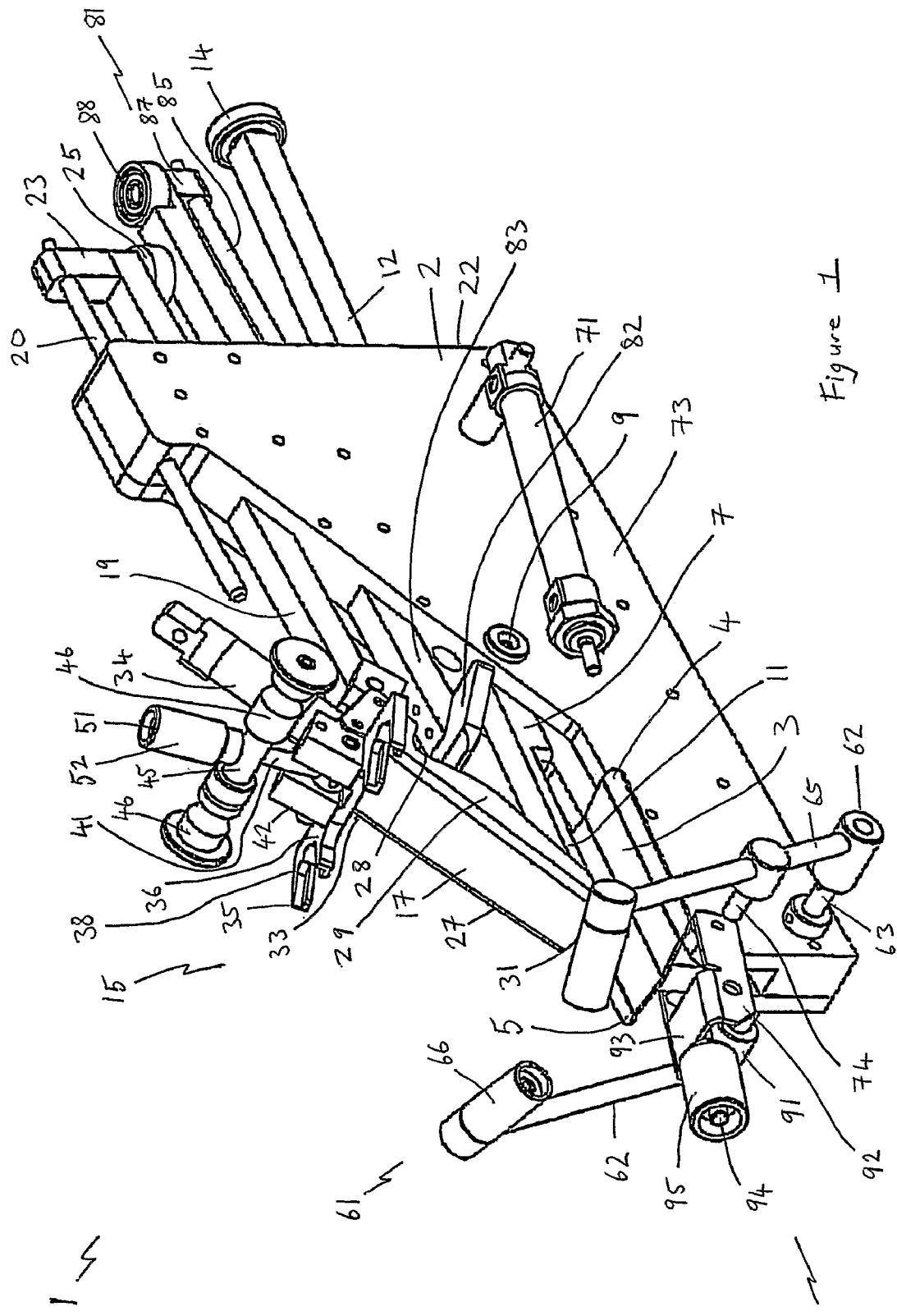
FIG. 1 is a perspective view of a trussing apparatus in accordance with the invention.

Referring to FIG. 1 there is shown a trussing apparatus indicated generally by the reference numeral 1. The trussing apparatus 1 is referred to as a long shank trussing apparatus 1 and is used with birds which have there shanks retained on the ends of their legs. An alternative embodiment of trussing apparatus known as a short shank trussing apparatus is briefly described following the detailed description of the long shank trussing apparatus 1. The trussing apparatus 1 comprises a main body 2 having a platform 3 for supporting a chicken or other similar bird (not shown) breast bone up. The platform 3 has a chicken keel end 4 and a chicken wishbone end 5. An elongate clamping bar 7 is pivotally mounted on the main body 2 about pivot 9 and extends from behind the main body 2 therethrough and projects from the keel end of the main body 2 into the space above the platform 3 and into the body cavity of a chicken resting thereon (not shown) in use. The elongate clamping bar 7 has a clamping end 11 and a drive-engaging end 12 carrying a roller 14. Alternatively, the drive-engaging end 12 may have a mounting bracket for receiving the driving rod of a pneumatic cylinder.

A shank insertion arrangement indicated generally by the reference number 15 has a chute 17 pivotally mounted to an elongate shank insertion bar 19 which is slidably mounted in the main body 2. The longitudinal axis of the shank insertion bar 19 is substantially parallel to the main plane of the main body 2.

The shank insertion bar 19 has a guide bar 20 which carries a biasing device such as a compression spring (not shown) between the rear end wall 22 of the main body 2 and a drive-engaging end 23 of the shank insertion bar 19 distal from the chute 17. This drive-engaging end 23 also carries a wheel 25.

The chute 17 is an inverted u-shaped section 27 having mutually opposing cutaway slots 28 on opposite lateral side members 29 of the inverted u-shaped section 27.

The chute 17 extends free end 31 first into the body cavity of a chicken through the keel end of the chicken. The chute 17 also has a tucking member (not shown) normally located about the pivotally mounted end 33 of the chute 17 which tucking member is housed within the confines of the u-shaped section 27. The tucking member is slidably movable from the pivotally mounted end 33 towards the free end 31 of the chute 17 by a pneumatic cylinder 34 having a longitudinal axis parallel to the longitudinal axis of the chute 17.

A pair of shackles 35 is mounted on a mounting block 42 on top of the pivotally mounted end 33 of the chute 17. The shackles 35 are provided by an elongate bracket 36 extending transverse the longitudinal axis of the chute 17, the bracket 36 having a u-shaped recess 38 on opposite ends thereof. A lever 41 is pivotally mounted on the mounting block 42.

The lever 41 has an elongate presser bar 45 mounted midway along the length of the lever 41 transverse of and substantially perpendicular to the levers longitudinal axis. The presser bar 45 has a rigid roller 46 on both of its opposite ends. The presser bar 45 is spaced apart from the shackle bracket 36 and the longitudinal axis of the shackle bracket 36 and the longitudinal axis of the presser bar 45 are substantially parallel. A free drive-engaging end 51 of the lever 41 carries a roller 52. A biasing device (not shown) is mounted intermediate the lever 41 and the mounting block 42 to return the lever 41 to the position shown in the drawing after the lever 41 is pivoted forward by a drive means (not shown) to flex the tendons of the thicken legs held in the shackle bracket 36.

A leg engaging and supporting arrangement indicated generally by the reference numeral 61 comprises a pair of mirror image rod arrangements 62 each having a substantially horizontal mounting rod 63 pivotally mounted transverse the main plane of the main body 2 and extending laterally therefrom at or about the wishbone end of the main body 2. An elongate bar 65 is mounted on the mounting rod 63 substantially perpendicular to the longitudinal axis of the mounting rod 63 and the elongate bar 65 has a plane of rotation substantially parallel to the main plane of the main body 2. A leg-engaging rod 66 is mounted on the end of the elongate bar 65. A leg-supporting rod (not shown) is mounted on the end of the elongate bar 65 with a longitudinal axis substantially parallel to the main plane of the main body 2 and extends in the direction from the keel end to the wishbone end of the main body 2. Actuation of each rod arrangement 82 is provided by two pneumatic cylinders 71 one of which is mounted between each lateral surface 73 of the main body 2 and both mounting rods 74, one of which is shown.

A bird body compression arrangement indicated generally by the reference numeral 81 has a pusher plate 82 mounted on a pusher plate bar 83 which is slidably mounted in the main body 2 intermediate the shank insertion bar 19 and the clamping bar 7. The pusher plate bar 83 has a pusher plate guide rod 85 which carries a biasing means such as a compression spring, not shown, intermediate the rear end wall 22 of the main body 2 and the drive engaging end 87 is of the pusher plate bar 83. The drive engaging end 87 of the pusher plate bar 83 has a wheel 88.

The second component part of the compression arrangement 81 is the breast lifting mechanism 91 comprising a breast-lifting lever 92 pivotally mounted on the wishbone end of the main body 2. The lever 92 has a breast engaging plate 93 and a free end 94 of the lever 92 has a drive-engaging roller 95.

Figure 2:
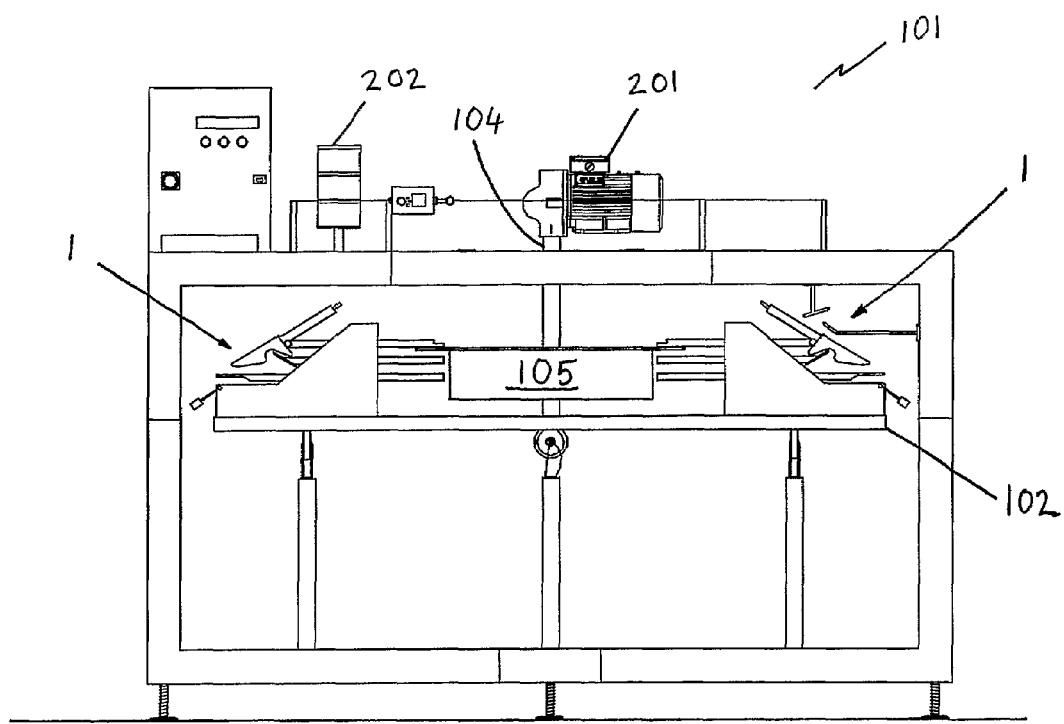
FIG. 2 is a side elevational view of a carousel trussing assembly.
Figure 3:
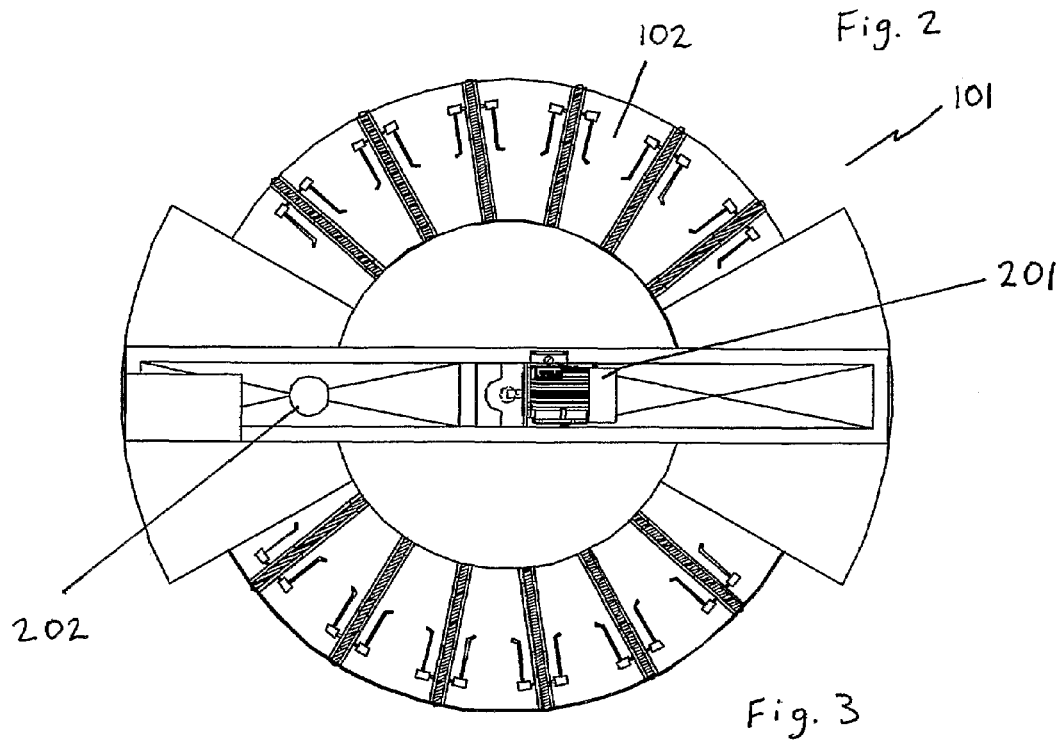
FIG. 3 is a top plan view of the carousel trussing assembly of FIG. 2.

Referring to the drawings and now to FIGS. 2 and 3, there is shown a preferred carousel trussing assembly indicated generally by the reference numeral 101. In this carousel trussing assembly 101, a plurality of long shank trussing apparatuses 1 (two of which are shown) are mounted on a rotating table 102. The table 102 is rotated by a central drive shaft 104 powered by a motor and gearbox 201. A central cam 105 is fixed and has a first surface for engaging with the wheel 25 of the shank insertion bar 19. The same cam 105 has a second surface which is operably engagable with the wheel 88 of the pusher plate bar 83, see FIG. 1. A clamping bar circular guide rail is also mounted on a stationary component of the assembly 101 and it has two circumferential portions at different vertical heights for engaging with the roller 14 of the elongate clamping bar 7 to move the clamping bar 7 between a clamping position and a non-clamping position. Additionally, a presser bar circular guide rail and a breast lifting circular guide rail are provided to engage the roller 52 of the presser bar 45 and the roller 94 of the breast lifting mechanism lever 92 respectively at appropriate positions during the rotation of the table 102.

Additionally, a circular shank flexing rail is provided in front of the shackle bracket 36 at the angular positions where the presser bar 45 is urged forward by its associated guide rail and at positions where the cylinders 71 are actuated. The shank-flexing rail is located in front of the shackle bracket 36 at these locations to prevent the shanks from being pressed out of the shackle bracket 36. A lighting system 202 is also located on the assembly 101 to act as an alarm to indicate to an operator that it is time for a break.

In use, the chicken trussing apparatus 1 is mounted on a rotating table 102 or on a linear conveyor system. It will also be appreciated that the chicken trussing apparatus 1 can be operated in a stationary position with suitable electric, pneumatic, mechanical or electromagnetic drive means causing the necessary staged motions of the moving parts of the apparatus 1 under a control means such as a microcontroller avoiding the need for a moving conveyor.

The apparatus 1 and assembly 101 is now described in use with a number of apparatuses 1 mounted on the rotating table 102 of FIG. 2 and FIG. 3. Each apparatus 1 passes by an operator who loads a bird onto each apparatus 1 at the desired speed of rotation of the table 102. The table 102 has variable speeds so that the factory management can adjust the table speed to suit the level of experience of the personnel manning the table 102 at that particular time. The loading operative lifts the chicken by the two legs and positions the bird so as the clamping bar 7 and the chute 17 enters the bird cavity. At this point of rotation of the table 102, a cam surface of the central cam 105 acts on the cam follow wheel 25 to push the shank insertion bar 19 into a forward bird engaging position. The operative also positions both of the bird's legs into the corresponding unshaped recess 38 on the shackle bracket 36. They also push the bird far enough onto the trussing apparatus 1 until the tail of the bird reaches a target spot marked clearly on the clamping bar 7.

When the bird is loaded on the trussing apparatus 1 which is continually rotating at a preset speed, the central cam 105 or a pneumatic cylinder (not shown) forces the drive engaging end 12 of the clamping bar 7 upwards which rotates about pivot 9 thus moving the clamping end 11 downwards which causes the' bird to be clamped between the clamping bar 7 and the platform 3. The platform 3 is spring mounted therefore it is capable of vertical movement in use compensating for differences in different thickness of back bones of birds. This difference in size is the case in different sizes of birds and also different breeds of chickens. The bird is now securely clamped on the trussing apparatus 1.

The leg engaging and supporting arrangement 61 has two functions. Firstly, it is used to position the chicken's legs into the shackle bracket 36 correctly and secondly it is used to bend the chicken's legs forward until they are substantially over the wings.

As the bird on the apparatus 1 rotates under a guarded area for operative protection, the legs that are in the shackle bracket 36 pass behind a stationary shackle guide rail. At this stage, a signal actuates the pneumatic cylinders 71 and the leg engaging and supporting mechanism 61 is rotated forward and the leg engaging rod 66 engages the chicken's legs trying to remove the legs from the shackle bracket 36. As there is a shackle guide rail in front of the chicken's legs, they are instead of being removed, pulled down further into the shackle 35 and in turn the hinge point of the shank of the bird is positioned tight down against the shackle 35. At this time the leg supporting rod support the birds' thighs preventing them from dragging along the shackle guide rail which would cause them to twist and result in leg breakage.

When the legs are pulled into the shackle 35, the presser bar 45 is commenced. The roller 52 is acted on by a circular presser bar guide rail which forces the rigid rollers 46 to move over the shanks forcing the shanks to be bent or stretched over the shackle guide rail which temporarily retains the legs within the shackle 35. Once the shanks are bent the shackle guide rail which is holding the legs in the shackle 35 no longer needs to be in place in front of the shackle bracket 36.

As the shanks have now been bent, the leg engaging and supporting mechanism 61 is again actuated by the pneumatic cylinders 71 to push the legs out of the shackle 35 and move them fully forward until they are bent right forward until they are almost touching the wings. At this point the leg engaging and supporting mechanism 61 moves backward to its resting position by actuation of the pneumatic cylinders 71.

The bird has now come out of the enclosed protective tunnel area and the two legs are exposed towards an operative who places an elastic band around the two shanks in a figure eight configuration. A loop from the elastic band is pulled forward and positioned over the breast of the bird at the wish bone end. The operative also manually tucks in the wings for visual presentation.

At this point the chute 17 is fully extended forward inside the bird and is held forward by use of a circular cam 105. The operatives, known as the leg operatives, take a leg in each hand and move them back towards the chute 17. He carefully positions the shanks through the cut away slots 28 in each side of the chute 17 in front of the tucking member. At the same time he carefully positions the elastic band which is in a figure eight around the shanks over the point of the keel bone of the bird. The operatives' role is now finished.

As the table 102 continues to rotate the trussing apparatuses 1 enter a second protected tunnel area and a signal actuates the pneumatic cylinder 34 and causes the tucking member to move forward and forces the shanks to bend forward down the inside of the chute 17. They are now positioned in a shape ready to be directed down the chute 17 into the bird cavity.

At this point the pusher plate 82 starts to move forward by actuation of the central cam 105 on wheel 88 and simultaneously the breast support plate 93 starts to move upwards by use of an external guiding cam acting on the roller 95.

The pusher plate 82 continues to move forward and is strategically designed so as it just rides over the top of the shanks which holds the shanks down, but also causes enough aggression so as to push the shanks and legs forward towards the cavity of the bird.

As this pusher plate 82 is moving forward so also is the breast engaging plate 93 moving to push the breast high up over the legs. When both have finished their movement, the keel of the bird is on a vertical plane and behind the shanks of the bird.

Both the pusher plate 82 and the breast engaging plate 93 remain in this position and hold the bird effectively exerting pressure towards each other with the bird held in the middle. At this stage the surface of cam 105 acting on wheel 25 allows the chute 17 to move backwards out of the bird.

As the chute 17 moves out of the bird, the keel of the bird and the shanks remain in their held position and the keel that has the elastic over it is pulled down tightly over the shanks.

The pusher plate 82 and the breast engaging plate 93 both move back to their resting positions as a result of disengagement with their respective cam surfaces and the bird is held together by the tension of the elastic band. The trussing apparatuses now move out of the second protected tunnel. At this stage the pressure exerted on the clamping bar 7 is relaxed as a result of disengagement of the wheel 14 from the its associated cam surface allowing the bird to be manually or automatically removed leaving the trussing apparatus 1 empty and available for reloading as it passes in front of the loading operative and ready to commence another cycle.

In the manual tying of chickens each operative is exposed to strenuous repetitive strain injury, RSI. In this invention, the strenuous jobs which are the bending of shanks and bending of legs and the insertion of shanks into the body cavity are removed from the operator immediately reducing the effects of RSI. With a view to reducing the harmful effects of RSI even further, the assembly has a three coloured stacked light system, which changes colour at an interval, deemed suitable by the health and safety team of the factory going to use the machine. This is fully adjustable from 1 min to 24 hours, although 30 mins appears an acceptable time frame. This if properly managed should create a management tool to minimise RSI.

In a second embodiment of trussing apparatus, referred to as a short shank trussing apparatus, the identical components as used and described above in relation to the long shank trussing apparatus 1 are used apart form the components required to flex the shanks and insert them into the body cavity of the bird. The components which are omitted from the short shank trussing apparatus are the chute 17, the lever 41, the presser bar 45, the rollers 46, the shank tucking member and the pneumatic cylinder 34. Additionally, there is no requirement for the components forming part of the compression arrangement 81. The second embodiment is referred to as the short shank trussing apparatus because the birds' shanks are removed from their legs before trussing begins. In one particularly preferred embodiment of short shank trussing assembly a saw is mounted on the assembly and cuts the birds' shanks off their legs as a first stage of the trussing operation. The saw may be mounted on the assembly at or about the location where the shackle guard rail first passes in front of the shackle to clamp the birds' legs therein. The saw may be mounted on an internal portion of a guard and is optionally an electrically powered saw.

In use of the second embodiment of short shank trussing assembly, all of the steps other than the shank insertion steps, the pressing steps and the compressing steps are carried out.

Variations and modifications can be made without departing from the scope of the invention as defined in the appended claims.

The invention claimed is:

1. An apparatus for trussing a bird comprising a main body having a platform for supporting a bird to be trussed, the platform and main body having a bird keel end and a bird wishbone end, clamping means movably mounted on the main body for securing the bird on the platform and releasing the bird from the platform, shackle means mounted on the main body and being disposed above the bird keel end of the platform for receiving and at least temporarily securing the legs of the bird, a leg engaging and supporting means movably mounted on opposite lateral locations of the main body for tightening leg knuckles of the bird into the shackle means before flexing, for preventing twisting of the legs and for bending the legs over the wings, a first drive means operably engagable with the clamping means, the shackle means and the leg engaging and supporting means to sequentially clamp the bird, shackle, stretch and flex the clamped birds legs and to release the clamped bird.

2. An apparatus according to claim 1, further comprising a bird leg shank insertion means movably mounted on the main body to receive and urge the bird's leg shanks inside the bird's own body cavity and a second drive means operably engagable with the shank insertion means.

3. An apparatus according to claim 2, further comprising a pressing means movably mounted on the shackle means, the pressing means being movable relative to the shackle means, and a third drive means operably engagable with the pressing means.

4. An apparatus according to claim 3, further comprising compression means (81) movably mounted on the wishbone end of the main body and the keel end of the main body to engage the wishbone end and the keel end of the bird and to compress these ends together, and a fourth drive means operably engagable with the compression means.

5. An apparatus according to claim 2, further comprising compression means (81) movably mounted on the wishbone end of the main body and the keel end of the main body to engage the wishbone end and the keel end of the bird and to compress these ends together, and a fourth drive means operably engagable with the compression means.

6. An apparatus according to claim 2, wherein the shank insertion means comprises a chute movably mounted on a shank insertion bar which is slidably mounted on the main body.

7. An apparatus according to claim 6, wherein the chute protrudes from the keel end of the main body and extends into a space above the platform and the clamping means.

8. An apparatus according to claim 7, wherein the shank insertion means comprises an associated shank-tucking member slidably movable along the chute.

9. An apparatus according to claim 8, wherein the shank-tucking member is normally located at the keel end of the chute and is operable between this normal position and a location along the chute toward the wishbone end of the chute by a shank tucking member drive means.

10. An apparatus according to claim 6, wherein the shank insertion means comprises an associated shank-tucking member slidably movable along the chute.

11. An apparatus according to claim 10, wherein the shank-tucking member is normally located at the keel end of the chute and is operable between this normal position and a location along the chute toward the wishbone end of the chute by a shank tucking member drive means.

12. An apparatus according to claim 6, wherein the chute is an inverted generally u-shaped section having mutually opposing cutaway slots on opposite lateral side members of the u-shaped section.

13. An apparatus according to claim 6, wherein the chute is pivotally mounted on one end of the shank insertion bar.

14. An apparatus according to claim 13, wherein the other end of the shank insertion bar has drive-engaging means.

15. An apparatus according to claim 6, wherein the shank insertion bar comprises a biasing means normally biasing the chute into a retracted position out of the body cavity of the bird.

16. An apparatus according to claim 2, wherein the second drive means comprises a tucking member actuator for actuating the tucking member of the shank insertion means and a first cam surface operably engagable with the shank insertion means to move it between a chicken loading position where the shank insertion means is located over the platform to be inside the body cavity of a chicken and a chicken unloading position where the shank insertion means is withdrawn out of the body cavity of the chicken.

17. An apparatus according to claim 1, wherein a pressing means movably mounted on the shackle means, the pressing means being movable relative to the shackle means, and a third drive means operably engagable with the pressing means.

18. An apparatus according to claim 17, further comprising compression means (81) movably mounted on the wishbone end of the main body and the keel end of the main body to engage the wishbone end and the keel end of the bird and to compress these ends together, and a fourth drive means operably engagable with the compression means.

19. An apparatus according to claim 17, wherein each drive means comprises a number of actuators selected from a group consisting of cams, guide rails, pneumatic and electromagnetic actuators.

20. An apparatus according to claim 17, wherein the pressing means comprises a lever carrying an elongate presser bar having a rigid roller on opposite ends of the presser bar.

21. An apparatus according to claim 17, wherein the third drive means comprises a pressing guide for operable engagement with the pressing means for moving the pressing means between a normally retracted inoperative mode and an operative fully forward mode for flexing a chickens tendons by bending their shanks forward.

22. An apparatus according to claim 1, further comprising compression means (81) movably mounted on the wishbone end of the main body and the keel end of the main body to engage the wishbone end and the keel end of the bird and to compress these ends together, and a fourth drive means operably engagable with the compression means.

23. An apparatus according to claim 1, wherein the clamping means comprises an elongate clamping bar pivotally mounted about pivot on the main body.

24. An apparatus according to claim 23, wherein the elongate clamping bar protrudes from the keel end of the main body centrally above the platform.

25. An apparatus according to claim 24, wherein the elongate clamping bar has a bird clamping end and a drive means engaging end.

26. An apparatus according to claim 23, wherein the elongate clamping bar has a bird clamping end and a drive means engaging end.

27. An apparatus according to claim 23, wherein the compression means comprises a pusher plate movably mounted on the main body intermediate a chute and the clamping bar, and a breast lifting mechanism movably mounted on the bird wishbone end of the main body.

28. An apparatus according to claim 27, further comprising an elongate pusher plate bar which is slidably mounted on the main body, the pusher plate being mounted on the pusher plate bar.

29. An apparatus according to claim 28, wherein the end of the pusher plate bar distal from the pusher plate has means for engaging drive means.

30. An apparatus according to claim 27, wherein the pusher plate is inclined at a predetermined angle for optimising shank and leg insertion into the body cavity of the bird.

31. An apparatus according to claim 30, wherein the angle of the pusher plate is in the range of 20° to 40°.

32. An apparatus according to claim 27, wherein the pusher plate bar comprises a biasing means normally biasing the pusher plate towards the main body away from the keel end of the main body.

33. An apparatus according to claim 27, wherein the breast lifting mechanism comprises a breast engaging plate mounted on a lever which is pivotally mounted on the bird wishbone end of the main body, the end of the lever distal from the pivot having means for engaging a drive means.

34. An apparatus according to claim 27, further comprising a breast-lifting mechanism guide for operable engagement with the breast-lifting mechanism for moving the mechanism between a normally lowered position into a raised position simultaneously with the action of a second cam surface moving the pusher plate forward to effect compression of the body of the bird.

35. An apparatus according to claim 1, wherein the shackle means comprises an elongate bracket extending transverse of the main plane of the main body at or about the bird keel end of the main body, the elongate bracket having a generally u-shaped recess on opposite ends of the elongate bracket for receiving the legs of the bird.

36. An apparatus according to claim 1, wherein the leg engaging and supporting means comprises a pair of mirror image rod arrangements each having a substantially horizontal mounting rod pivotally mounted at or about a lateral edge of the bird wishbone end of the main body.

37. An apparatus according to claim 36, further comprising an elongate member extending from the outer end of each mounting rod and has a plane of rotation substantially parallel to the main plane of the main body, and a leg engaging rod mounted at the end of the elongate member and extending toward the main body.

38. An apparatus according to claim 37, further comprising a leg supporting rod mounted on the elongate member adjacent the leg engaging rod and extending in a direction from the bird keel end to the bird wishbone end of the main body.

39. An apparatus according to claim 36, wherein the first drive means comprises a clamping guide operably engagable with the clamping means for moving the clamping means between a chicken clamping position and a chicken mounting and releasing position and a leg engaging and supporting means actuator for actuating the leg engaging and supporting means between an inoperative position and a leg supporting position and between an inoperative position and a leg stretching position and means for sealing and opening the shackle means.

40. An apparatus according to claim 1, wherein the platform is movable relative to the main body.

41. A carousel trussing assembly having a rotating table in operable engagement with a carousel trussing assembly drive means for rotating the table and a plurality of bird trussing apparatuses as claimed in claim 1 mounted on the rotating table.

* * * * *